(12) United States Patent
Kim et al.

(10) Patent No.: US 7,937,765 B2
(45) Date of Patent: May 3, 2011

(54) SYSTEM AND METHOD FOR CHECKING SECURITY OF PC

(75) Inventors: Kang San Kim, Daejeon (KR); Hyoung Chun Kim, Daejeon (KR); Soon Jwa Hong, Daejeon (KR); Eung Ki Park, Daejeon (KR); Choon Sik Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 819 days.

(21) Appl. No.: 11/936,909

(22) Filed: Nov. 8, 2007

(65) Prior Publication Data

US 2008/0115220 A1 May 15, 2008

(30) Foreign Application Priority Data

Nov. 9, 2006 (KR) .......................... 10-2006-0110496
Jun. 25, 2007 (KR) .......................... 10-2007-0062323

(51) Int. Cl.
*G06F 11/00* (2006.01)
(52) U.S. Cl. .......................................... 726/25; 726/22
(58) Field of Classification Search ................ 726/1, 22, 726/25; 713/188
See application file for complete search history.

(56) References Cited

U.S. PATENT DOCUMENTS 6,499,110 B1 * 12/2002 Moses et al. ...................... 726/1
2004/0003266 A1 * 1/2004 Moshir et al. .................. 713/191

FOREIGN PATENT DOCUMENTS

| JP | 2003-271557 A | 9/2003 |
|----|---------------|--------|
| JP | 2003-303114 A | 10/2003 |
| KR | 1020010059442 A | 7/2001 |
| KR | 1020030094921 A | 12/2003 |
| KR | 1020040106501 A | 12/2004 |
| KR | 1020060033603 | 4/2006 |

OTHER PUBLICATIONS

Young-Gyun Kim, et al: "Design of a Security-Vulnerability Diagnosing and Monitoring System;" Journal of Korean Information Science Society, vol. 28, No. 2, Fall 2001 pp. 739-741.
Hyun-Jin Seo, et al; "A System to Diagnose Security Vulnerabilityes of Systems on Based Web;" Journal of Korean Information Science Society, vol. 27, No. 2 Fall 2000, pp. 632-634.

* cited by examiner

*Primary Examiner* — Matthew B Smithers
*Assistant Examiner* — Ali S Abyaneh
(74) *Attorney, Agent, or Firm* — Ladas & Parry LLP

(57) ABSTRACT

Provided are a system and method for checking the security of a personal computer (PC). The system and method automatically check security to protect a PC from computer hacking, viruses, worms, Trojan horses, etc., and inform or cure a vulnerable point. The system and method automatically check and modify all the security check items so that a user who may not have professional computer knowledge can readily cope with a cyber attack, and describe the vulnerable point and the result of the cure to the user with ease. Therefore, the system and method can maintain a PC in its up-to-date state to prevent damage from a cyber attack, and minimize damage from a cyber threat against the main system and service.

14 Claims, 4 Drawing Sheets

SYSTEM AND METHOD FOR CHECKING SECURITY OF PC

CROSS-REFERENCE TO RELATED APPLICATION

This application claims priority to and the benefit of Korean Patent Application Nos. 2006-110496, filed Nov. 9, 2006, and 2007-62323, filed Jun. 25, 2007, the disclosures of which are incorporated herein by reference in their entirety.

BACKGROUND

1. Field of the Invention

The present invention relates to a system and method for checking the security of a personal computer (PC), and more particularly, to a PC security checking system and method for automatically checking a counterplan that a user can run to protect his/her PC from hacking, viruses, worms, Trojan horses, etc., informing the result to the user while automatically setting a required configuration, and thereby preventing damage from a cyber attack.

2. Discussion of Related Art

Lately, with the rapid development of information and communication technology such as the Internet, etc., cyber threats of computer hacking, viruses, worms, Trojan horses, etc., are on the increase. Thus, it has become natural to run a counterplan for protecting a PC by installing anti-virus programs, firewalls and so on. However, important tasks, such as up-to-date maintenance of the state of the programs, periodic checking of the programs, and upgrading with the most up-to-date security patches for the programs, that must be continuously performed after installation may not be properly conducted because general users may not be able to easily understand information that must be configured to increase the security of a PC.

In other words, general users may not be able to recognize the necessity and effect of various configurations. To solve the problem, it is necessary to establish a reference for each configuration. Therefore, a systematic method is required which establishes a PC security configuration reference for a safe computing environment, checks whether or not a configuration has been set on the basis of the reference, and thereby protects a PC from an unknown threat.

Currently, various programs and guidelines for increasing the security of a PC have been suggested, but there is no method of continuously managing them, checking or modifying the configurations of the programs and guidelines.

SUMMARY OF THE INVENTION

The present invention is directed to a personal computer (PC) security checking system and method for automatically checking a counterplan that a user can run to protect his/her PC from hacking, viruses, worms, Trojan horses, etc., informing the result to the user while automatically setting a required configuration, and thereby preventing damage from a cyber attack.

One aspect of the present invention provides a system for checking security of a PC, the system comprising: a user interface and graphic user interface (GUI) management module for managing an input of a user and controlling a screen; a check reference management module, in cooperation with the user interface and GUI management module, for displaying check reference information on the screen and allowing the user to change the check reference information; an automatic check module for comparing the check reference information with system information to generate check result information; and a check result management module for displaying the check result information through the user interface and GUI management module and automatically correcting either an item selected by the user or all items.

Another aspect of the present invention provides a method of checking security of a PC, the method comprising the steps of: (a) storing check reference information; (b) generating and storing log information after starting an automatic check; (c) checking whether or not the check reference information needs to be updated with up-to-date information, and updating the check reference information; (d) collecting system information from registry information, file information and system configuration information; (e) comparing the collected system information with the check reference information and generating check result information; (f) generating history information on the basis of the log information and the check result information; and (g) displaying and automatically correcting the check result information.

The system and method for checking the security of a PC according to the present invention have been developed to be compatible with a Windows platform, and may be installed to operate in a local PC.

The user may check or change the check reference through the check reference management module. The check reference may be set to a default value whose safety is verified on the basis of a research result, or may otherwise be changed by the user.

The automatic check module actually performs an automatic check, whereby a log generation module is executed to record a required item as a log during operation, up-to-date information (a check date), information on Windows security patch distribution, etc., is retrieved, an up-to-date information update module for updating the check reference information is executed, and then the system information is collected and compared with the check reference information. The result of the automatic check is recorded as the check result information, and the log generation module is terminated, thereby terminating the operation of the automatic check module.

The check result management module summarizes and displays an up-to-date security check result using the check result information, automatically corrects check items to secure the PC, and displays or prints a statistic of the check result on the screen.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
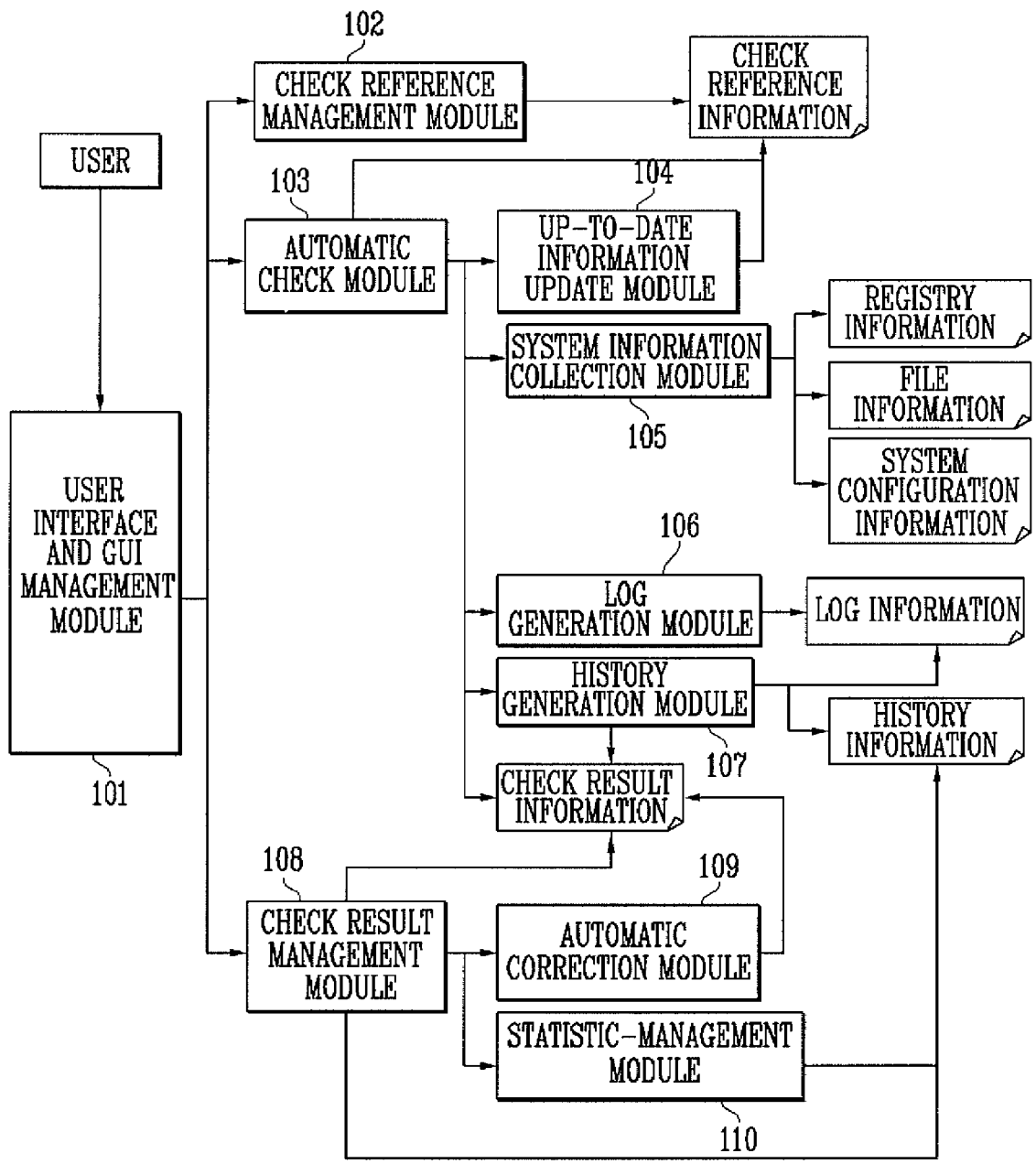
FIG. 1 is a block diagram of a system for automatically checking the security of a personal computer (PC) according to an exemplary embodiment of the present invention.

FIG. 1 is a block diagram of a system for automatically checking the security of a personal computer (PC) according to an exemplary embodiment of the present invention.

As illustrated in FIG. 1, the system for automatically checking the security of a PC according to an exemplary embodiment of the present invention comprises a user interface and graphic user interface (GUI) management module 101, a check reference management module 102, an automatic check module 103, an up-to-date information update module 104, a system information collection module 105, a log generation module 106, a history generation module 107, a check result management module 108, an automatic correction module 109, and a statistic-management module 110.

The user interface and GUI management module 101 is executed upon start of the system, and processes an input from a user or displays a screen according to an operation state.

The check reference management module 102 reads and displays check reference information so that the user can confirm a check reference. The check reference information generally indicates recommended values for safely setting each security configuration that can be checked by the PC security check system according to an exemplary embodiment of the present invention. The check reference information is compared with system information collected by the system information collection module 105, and the user may change it to strengthen or weaken a security reference as occasion demands.

The automatic check module 103 generates check result information on the basis of the check reference information, and controls operation of the up-to-date information update module 104, the system information collection module 105, the log generation module 106 and the history generation module 107.

The up-to-date information update module 104 reads the check reference information and retrieves the up-to-date information. When the up-to-date information exists, the up-to-date information update module 104 updates the check reference information using the up-to-date information and is terminated according to the control of the automatic check module 103.

The system information collection module 105 collects system information from return values of a registry query, a Windows Management Instrumentation (WMI) query and a Win32 Application Programming Interface (API), and is terminated according to the control of the automatic check module 103. The automatic check module 103 compares the collected system information with the read check reference information and determines whether or not the system information complies with the check reference information, thereby generating check result information based on the determination. The system information generally indicates entire values currently having been set in respective security configurations that can be obtained as a return value of the registry query, the WMI query or the Win32 API by the system information collection module 105 for comparison with the check reference information. The automatic check module 103 compares the system information with the check reference information, and thereby the check result information indicates whether or not the system information has been safely configured. The log generation module 106 generates log information, and continuously records the log information until the automatic check module 103 stops the log generation module 106. The log information may generally indicate a start time and a shutdown time of the PC security check system according to an exemplary embodiment of the present invention and a name, a value and a generation time, which includes a date, of check reference information changed by the check reference management module 102, information updated by the up-to-date information update module 104, and information corrected by the automatic correction module 109.

The history generation module 107 generates history information, and is terminated according to the control of the automatic check module 103. The history information may include data obtained by arranging, according to date, the check result information generated by the automatic check module 103 and the log information generated by the log generation module 106. In other words, the history information includes the names and number of security configurations that do not comply with the check reference information.

The check result management module 108 displays summarized information of the up-to-date check result on a screen on the basis of the check result information generated by the system information collection module 105 and controls operation of the automatic correction module 109 and the statistic-management module 110.

The automatic correction module 109 automatically corrects items not complying with the check reference to comply with the same, and the statistic-management module 110 displays statistics on the screen in the form of a graph or table. The statistics may be about the security configurations that have not complied with the check reference information for a period of a previous one week, one month, 6 months and one year, or the number of the security configurations.

The user may check the summarized information and select automatic correction of an item, display of statistics, print of a screen, display of a history, shutdown, and so on. According to the selection of the user, the automatic correction module 109 or the statistic-management module 110 may perform its operation. A method of checking the security of a PC in a system having the above described constitution according to an exemplary embodiment of the present invention will now be described below with reference to FIGS. 2 to 4.

Figure 2:
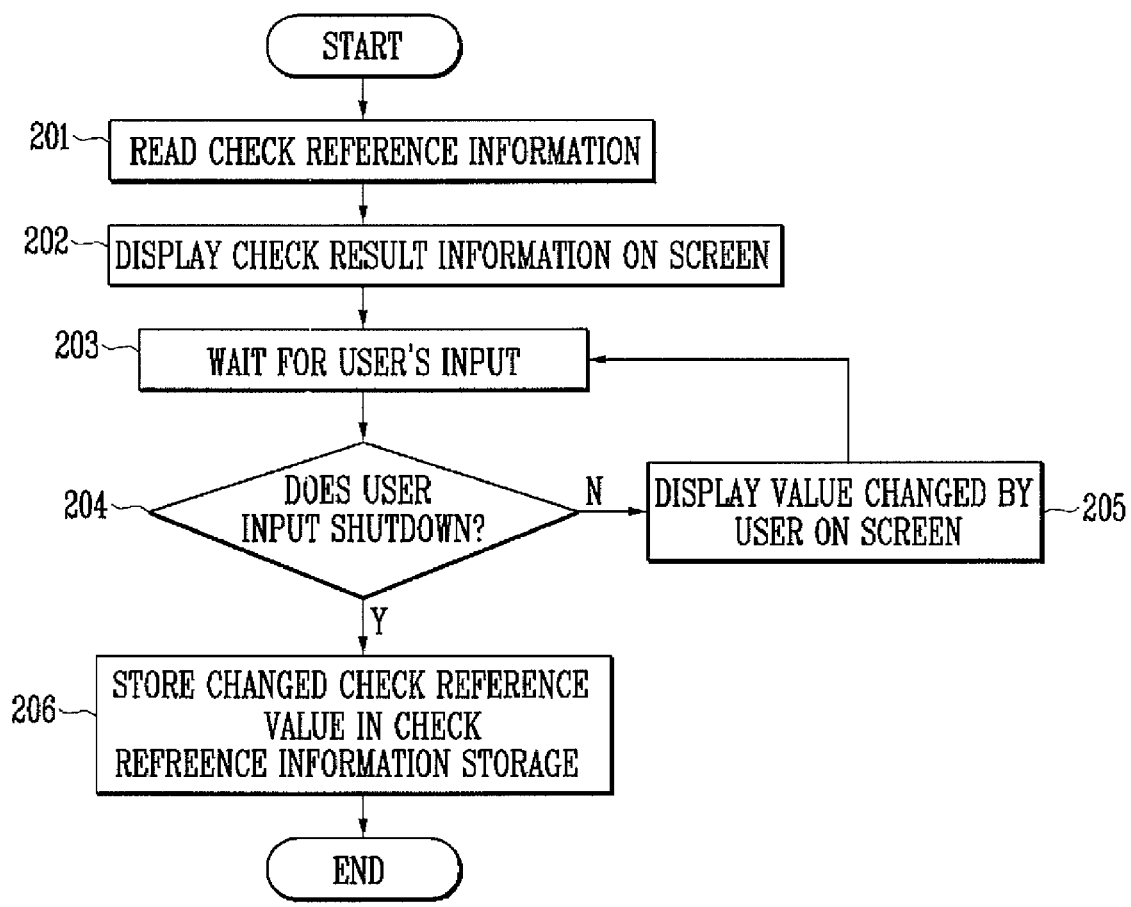
FIG. 2 is a flowchart showing a process of a check reference management module according to an exemplary embodiment of the present invention.

FIG. 2 is a flowchart showing a process of the check reference management module 102 according to an exemplary embodiment of the present invention.

As illustrated in FIG. 2, when the check reference management module 102 is executed by an input of a user through the user interface and GUI management module 101, the check reference management module 102 reads check reference information (step 201) and displays the information on a screen so that the user can confirm the check reference (step 202). Subsequently, the user confirms the check reference, and may immediately terminated a system or change a check reference value (steps 203 to 205). The changed check reference value is stored in a check reference information storage (step 206).

Figure 3:
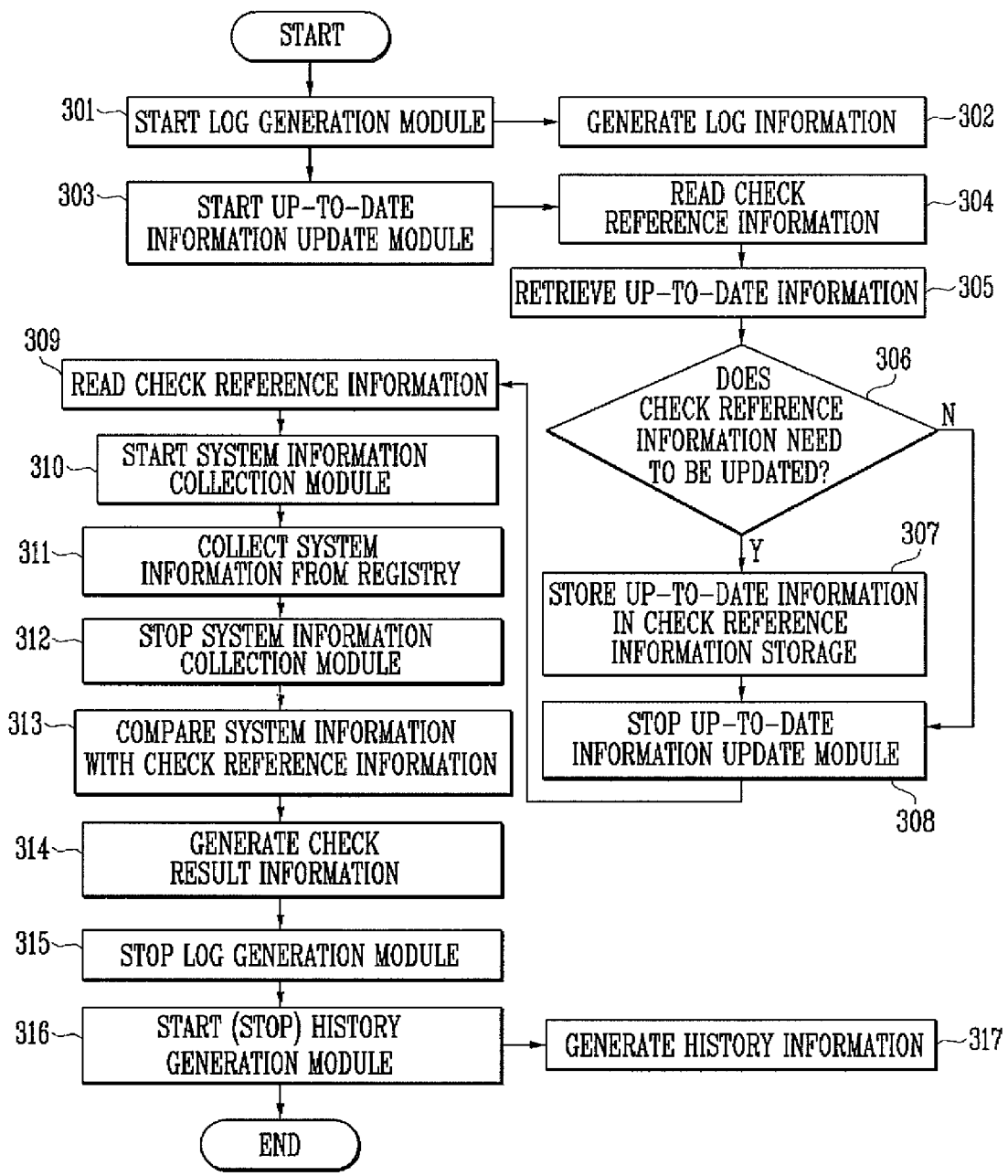
FIG. 3 is a flowchart showing a process of an automatic check module according to an exemplary embodiment of the present invention.

FIG. 3 is a flowchart showing a process of the automatic check module 103 according to an exemplary embodiment of the present invention.

As illustrated in FIG. 3, when the automatic check module 103 is executed by an input of a user through the user interface and GUI management module 101, the automatic check module 103 first drives the log generation module 106 (step 301). Subsequently, the log generation module 106 generates log information (step 302). The automatic check module 103 continuously records the log information until it stops the log generation module 106. Meanwhile, the automatic check module 103 starts the up-to-date information update module 104 upon start of the log generation module 106 (step 303).

The up-to-date information update module 104 reads check reference information (step 304) and retrieves the up-to-date information (step 305). For example, the up-to-date information may indicate distribution of a new Windows security patch, which can be retrieved online from a distribution site, e.g., www.microsoft.com, for the corresponding program, and so on. When there exists the up-to-date information required for an update (step 306), the up-to-date information update module 104 stores the up-to-date information in a check reference information storage (step 307) and then is stopped by the automatic check module 103 (step 308). When the up-to-date information update module 104 is stopped, the automatic check module 103 reads the check reference information (step 309) and starts the system information collection module 105 (step 310).

The system information collection module 105 collects system information from return values of a registry query, a WMI query and a Win32 API (step 311) and is stopped by the automatic check module 103 (step 312). The automatic check module 103 compares the collected system information with the read check reference information (step 313). The automatic check module 103 generates check result information on whether or not the system information complies with the check reference information (step 314) and stops the log generation module 106 (step 315). Subsequently, the automatic check module 103 executes the history generation module 107 (step 316) to generate history information (step 317) and terminates its own operation.

Figure 4:
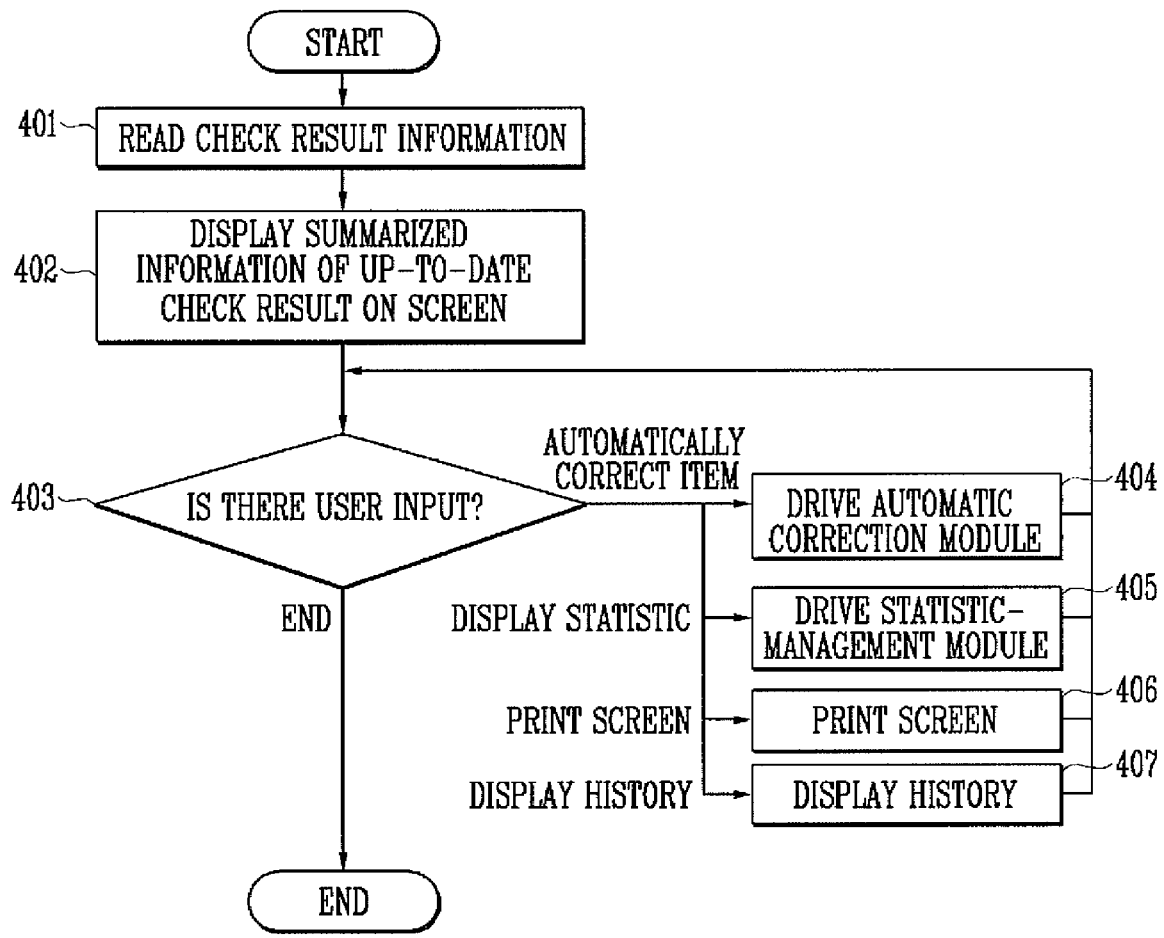
FIG. 4 is a flowchart showing a process of a check result management module according to an exemplary embodiment of the present invention.

FIG. 4 is a flowchart showing a process of the check result management module 108 according to an exemplary embodiment of the present invention.

As illustrated in FIG. 4, when the check result management module 108 is executed by an input of a user through the user interface and GUI management module 101, the check result management module 108 reads check result information (step 401) and displays summarized information of the up-to-date check result on a screen (step 402).

Subsequently, the user confirms the summarized information, selects automatic correction of an item, display of statistics, print of a screen, display of a history, shutdown, etc., to execute the automatic correction module 109 (step 404), execute the statistic-management module 110 (step 405), print a screen (step 406), display a history (step 407), or stop the check result management module 108.

As described above, the system and method for checking the security of a PC according to the present invention allow a user to readily check the state of a PC and configure a required item, thereby allowing the user to immediately cope with a cyber threat. Therefore, it is possible to prevent or minimize damage from computer hacking, viruses, worms, Trojan horses, and so on.

In addition, a clear basis of a check reference is suggested to a user, and flexible security management is allowed because the basis can be changed by the user when necessary. Also, post-maintenance is facilitated because modules are classified according to their functions. In particular, it is easy to increase items that can be checked. It is possible to perform safer and more accurate checking using a registry to collect system information for security check, because the registry is difficult to access from a remote location and not likely to be modified by an external attack.

In addition, it is possible to automatically receive integrated service even when a user may not have knowledge of computers. The system and method prevent security problems and also manage a fault, thereby keeping a PC in its optimum state. Further, the system and method can be used by a user having knowledge of security and also allow a user having knowledge of security to change a check reference, thereby providing a more powerful function to the user. Furthermore, since history information is displayed, it is possible to check the step-specific security state of a computer depending on time at a glance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A personal computer (PC) system comprising:
   a processor; and
   a security checking system that is executable on the processor for checking the security of the PC system; the security checking system comprising:
   a user interface and graphic user interface (GUI) management module for managing an input of a user and controlling a screen;
   a check reference management module, in cooperation with the user interface and GUI management module, for displaying check reference information indicating recommended values for setting security configurations on the screen and allowing the user to change the check reference information;
   a system information collection module for collecting system information indicating the current values of each of the security configurations;
   an automatic check module for comparing the recommended values of the check reference information with the current values of the system information to generate check result information; and
   an up-to-date information update module for retrieving up-to-date information and thereby automatically updating the check reference information;
   a log generation module for generating log information, the log information including information on the updated check reference information;
   a history generation module for generating history information about security configurations that do not comply with the check reference information by using the log information and the check result information;
   a check result management module for displaying the check result information through the user interface and GUI management module and automatically correcting an item selected by the user or all items.

2. The PC system of claim 1:
   wherein the system information collection module collects the system information from registry information, file information, and system configuration information; and
   wherein the automatic check module controls startup and shutdown of the log generation module, the up-to-date information update module, the system information collection module and the history generation module.

3. The PC system of claim 2, wherein the security checking system further comprises:
   an automatic correction module for automatically correcting the item selected by the user or all the items using the check result information; and
   a statistic-management module for displaying statistics about the security configurations that have not complied with the check reference information over a predetermined period of time in a form of a graph or table using the history information,
wherein the check result management module controls startup and shutdown of the automatic correction module and the statistic-management module.

4. The PC system of claim 1, wherein the system information collection module collects the system information from return values of a registry query, a Windows Management Instrumentation Query and a Win32 Application Programming Interface.

5. The PC system of claim 1, wherein the log information generated by the log generation module includes a name, a value and a generation time of the updated check reference information.

6. A computer-implemented method of checking security of a personal computer (PC), the method comprising the steps of:
storing check reference information indicating recommended values for setting security configurations;
starting a log generation module for generating and storing log information after starting an automatic check;
checking whether or not the check reference information needs to be updated, updating the check reference information, and generating and storing, by the log generation module, log information on the updated check reference information;
collecting, by the PC, system information indicating the current values of the security configurations from a registry;
comparing the collected system information with the check reference information and generating check result information;
generating history information about security configurations that do not comply with the check reference information on the basis of the log information and the check result information; and
displaying the check result information and automatically correcting the check result information.

7. The computer-implemented method of claim 6, wherein a verified value is provided as a default value for the check result information, a user can modify the check result information, and the check result information is automatically updated according to items.

8. The computer-implemented method of claim 6, further comprising the step of:
displaying up-to-date history information or a statistic.

9. The method of claim 6, wherein collecting system information comprises collecting system information from return values of a registry query, a Windows Management Instrumentation Query and a Win32 Application Programming Interface.

10. A non-transitory computer-readable storage medium having stored thereon computer executable instructions for performing a method of checking security of a personal computer (PC), the method comprising the steps of:
storing check reference information indicating recommended values for setting security configurations;
starting a log generation module for generating and storing log information;
checking whether or not the check reference information needs to be updated, updating the check reference information, and generating and storing, by the log generation module, a name, a value and a generation time of the updated check reference information as log information;
collecting system information indicating the current values of the security configurations from a registry;
comparing the collected system information with the check reference information and generating check result information;
generating history information including the names and number of security configurations that do not comply with the check reference information by arranging, according to date, the check result information and the log information; and
displaying the check result information and automatically correcting, by an automatic correction module, the check result information, and generating and storing, by the log generation module, the check result information corrected by the automatic correction module;
using the history information to generate and display statistics about security configurations that have not complied with the check reference information over a predetermined period of time.

11. The method of claim 10, further comprising the steps of:
reading check reference information and displaying the information on a screen so that the user can confirm the check reference information and change a check reference value.

12. The method of claim 10, wherein a verified value is provided as a default value for the check result information, a user can modify the check result information, and the check result information is automatically updated according to items.

13. The method of claim 10, further comprising the step of:
displaying up-to-date history information or a statistic.

14. The method of claim 10, wherein collecting system information comprises collecting system information from return values of a registry query, a Windows Management Instrumentation Query and a Win32 Application Programming Interface.

* * * * *